(12) United States Patent
Gupta

(10) Patent No.: US 9,190,872 B2
(45) Date of Patent: Nov. 17, 2015

(54) COMPACT AND VOLTAGE STABLE AUTOMATIC CHANGE OVER SWITCH

(76) Inventor: Abhishek Gupta, Bangalore (IN)

( * ) Notice: Subject to any disclaimer, the term of this patent is extended or adjusted under 35 U.S.C. 154(b) by 577 days.

(21) Appl. No.: 13/695,023

(22) PCT Filed: Apr. 26, 2011

(86) PCT No.: PCT/IN2011/000273
§ 371 (c)(1),
(2), (4) Date: Dec. 3, 2012

(87) PCT Pub. No.: WO2011/145104
PCT Pub. Date: Nov. 24, 2011

(65) Prior Publication Data
US 2013/0062969 A1    Mar. 14, 2013

(30) Foreign Application Priority Data
Apr. 27, 2010    (IN) .......................... 1170/CHE/2010

(51) Int. Cl.
*H01H 47/00* (2006.01)
*H02J 9/06* (2006.01)
*H05B 41/285* (2006.01)
*H01H 47/22* (2006.01)

(52) U.S. Cl.
CPC .............. *H02J 9/06* (2013.01); *H05B 41/2853* (2013.01); *H01H 47/22* (2013.01); *Y02B 20/186* (2013.01); *Y10T 307/747* (2015.04)

(58) Field of Classification Search
CPC .......... H02J 9/00; H02J 9/0204; H04B 15/00; H05B 41/29; H05B 41/36
USPC ........................................................ 307/113
See application file for complete search history.

(56) References Cited

U.S. PATENT DOCUMENTS

| 5,910,689 A | 6/1999 | Ertz, III et al. |
| 2008/0197705 A1 | 8/2008 | Dewis et al. |

FOREIGN PATENT DOCUMENTS

| GB | 2303978 A | 3/1997 |

*Primary Examiner* — Thienvu Tran
*Assistant Examiner* — David M Stables
(74) *Attorney, Agent, or Firm* — Rahman LLC

(57) ABSTRACT

A voltage-stabilizing automatic change-over switch (200) includes a capacitive circuit (202) that receives an input voltage from supply mains, a rectifier with a filter unit (204) that receives an input voltage from the capacitive circuit and converts it to a DC voltage. The voltage drop across the capacitive circuit is directly proportional to the input voltage. Two single-pole relay switches (208) are directly connected to the rectifier with the filter unit (204). A voltage controller (206) maintains a voltage across the single-pole relay switches such that the voltage does not exceed a threshold voltage. The single-pole relay switches select either the supply mains or an input supply from a generator and connect to a load (210). The single-pole relay switches select the supply mains when coils of the single-pole relay switches are energized by the supply mains.

13 Claims, 16 Drawing Sheets

| Input Voltage (402) | Voltage across C2 (404) | Voltage across C4 (406) | Voltage across C3 (408) | Voltage across R1 (410) |
|---|---|---|---|---|
| 10 | .2 | 0 | 10.64 | 0.066 |
| 20 | 3.7 | 0 | 18.82 | 0.12 |
| 30 | 5.5 | 0 | 27.75 | 0.178 |
| 40 | 7.3 | 0.01 | 36.4 | 0.236 |
| 50 | 9 | 0.07 | 45.1 | 0.27 |
| 60 | 10.5 | 0.36 | 53.9 | 0.33 |
| 70 | 12 | 1.03 | 63.4 | 0.4 |
| 80 | 13.2 | 1.82 | 72.6 | 0.46 |
| 90 (relays LS1 and LS2 picks up) | 14.3 | 2.7 | 81.4 | 0.52 |
| 100 | 15.5 | 3.66 | 90.6 | 0.58 |
| 110 | 16.6 | 4.55 | 98.8 | 0.63 |
| 120 | 17.7 | 5.51 | 107.6 | 0.69 |
| 130 | 18.8 | 6.55 (relay LS3 picks up) | 117.3 | 0.76 |
| 140 | 20 | 7.62 | 126 | 0.81 |
| 150 | 21.2 | 8.68 | 135.3 | 0.87 |
| 160 | 22.2 | 9.7 | 144.3 | 0.93 |
| 170 | 23.2 | 10.54 | 153.1 | 0.99 |
| 180 | 24.1 | 11.35 | 162.8 | 1.05 |
| 190 | 24.7 | 11.83 | 172.2 | 1.12 |
| 200 | 25.1 | 12.17 | 182.1 | 1.18 |
| 220 | 25.7 | 12.59 | 201.6 | 1.3 |
| 230 | 25.9 | 12.75 | 212.9 | 1.39 |
| 240 | 26 | 12.83 | 221.5 | 1.46 |
| 250 | 26.1 | 12.9 | 231.2 | 1.51 |
| 260 | 26.2 | 12.95 | 242 | 1.57 |
| 270 | 26.4 | 12.98 | 254.3 | 1.61 |
| 280 | 26.7 | 13.3 | 262.3 | 1.68 |
| 285 | 27 | 13.4 | 273 | 1.75 |

FIG. 4A

| Input Voltage | Voltage across C2 | Voltage across C3 | Voltage across R1 |
|---|---|---|---|
| 40 | 7.2 | 32 | 0.26 |
| 60 | 10.9 | 55.9 | 0.367 |
| 80 | 14.4 | 75.2 | 0.48 |
| 86(relays LS1 and LS2 picks up) | 15.5 | 80.7 | 0.521 |
| 90 | 16.3 | 84.6 | 0.546 |
| 100 | 18.1 | 93.8 | 0.605 |
| 120 | 21.5 | 112.7 | 0.728 |
| 140 | 23.8 | 132 | 0.899 |
| 160 | 25 | 152 | 0.99 |
| 180 | 25.7 | 171 | 1.122 |
| 190 | 26 | 182 | 1.195 |
| 200 | 26.2 | 192 | 1.265 |
| 210 | 26.4 | 202 | 1.336 |
| 220 | 26.5 | 211.9 | 1.404 |
| 230 | 26.6 | 221.7 | 1.471 |
| 240 | 26.8 | 232.6 | 1.537 |
| 250 | 26.9 | 242.3 | 1.605 |
| 260 | 26.9 | 253 | 1.681 |
| 270 | 27 | 262.3 | 1.755 |
| 280 | 27.1 | 272.4 | 1.828 |
| 285 | 27.1 | 277.2 | 1.867 |

| 602 | 604 | 606 | 608 | 610 | 612 |
|---|---|---|---|---|---|
| INPUT VOLTAGE AC 50Hz to circuit h1 through MAINS input and also to the primary of the transformer Tr1. | VOLTAGE IN SECONDARY OF TRANSFORMER TR1 USED FOR EXPERIMENT | VOLTAGE ACROSS C3 | VOLTAGE ACROSS C2 | VOLTAGE ACROSS R1 | VOLTAGE ACROSS C4 |
| 50 | 2.81 | 42 | 8.48 | 0.284 | 0.003 |
| 90 | 5.19 | 80.2 | 14.07 | 0.51 | 2.45 |
| 103.2 | 5.84 | 91.7 | 15.58 | 0.58 | 3.72 |
| 120 | 7 | 108.6 | 17.69 | 0.724 | 5.52 |
| 131.5 | 7.61 | 118.1 | 19.2 | 0.76 | 6.67 |
| 163.8 | 9.49 | 147 | 22.8 | 0.98 | 10.15 |
| 200 | 11.64 | 183.3 | 25.2 | 1.19 | 12.22 |
| 221 | 12.91 | 205.3 | 25.8 | 1.34 | 12.7 |
| 240 | 13.58 | 224.1 | 26.1 | 1.48 | 12.92 |
| 252 | 14.59 | 235.8 | 26.2 | 1.56 | 12.96 |

FIG. 6A

COMPACT AND VOLTAGE STABLE AUTOMATIC CHANGE OVER SWITCH

BACKGROUND

1. Technical Field

The embodiments herein generally relate to electrical circuits, and, more particularly, to a compact and voltage stable automatic change over switch.

2. Description of the Related Art

Generally, in developing countries and more particularly in rural areas such as Bihar, and UP are common occurrence. Typically, people have their own power back-ups for generating power such as UPS, generators, etc. or either rent from a power supplier for running the appliances. However, one would not realise that when the mains power is back, there is still power being consumed from the generator, or either they have to manually turn off the supply from the generator. To overcome this, automatic change over switches are deployed in order to change the power supply from the mains to the generator or vice-versa.

FIG. 1 illustrates a traditional automatic change over switch 100 having a transformer unit 102, a rectifier with filter unit 104, a double pole relay switch 106, and a load 108. The transformer unit 102 is a step down transformer that receives an input of 230 volts alternating current (AC) from the mains. The transformer unit 102 step downs the voltage from the mains to a lower voltage. The output from the transformer unit 102 is 12 volts. This output (12V) is fed as an input to the rectifier with filter unit 104. The output voltage of the transformer unit 102 is constant with respect to the input voltage. For example, if the input decreases to 115 volts AC, the output also decreases to 6 volt and the coil of the double pole relay switch does not energise.

The rectifier with the filter unit 104 receives the 12 volts AC from the transformer unit 102 and converts to Direct Current (DC) voltage. The DC output voltage from the rectifier with filter unit 104 is fed to the double pole relay switch 106. The double pole relay switch 106 includes a coil. Typically, the double pole relay switch operates when some specified voltage is applied to its coil (not shown in FIG. 1). Simultaneously, an input from the mains and a generator are fed to the double pole relay switch 106.

Depending upon the automatic change over switch circuit 100, the double pole relay switch 106 selects any one of the input fed (e.g., the mains or the generator) and connects to the load. The main supply is selected and connected to the load if the coil is energized by the mains. Else, the supply from the generator is selected and connected to the load. Thus, the selection of the mains supply entirely depends on the mains voltage. If there is a voltage supply from the mains, then the double pole relay switch 106 will select the mains and connects to the load. Else, if there is no supply from the mains, the double pole relay switch 106 selects the generator and connects to the load. In other words, there is a voltage at the coil that will drive the double pole relay switch 106.

But, if the input voltage at the transformer increases more than 250 volts the coil voltage increase more than rated voltage of the coil and may damage the relay coil and the transformer winding coil due to high current. Thus, there is a limitation for applying the input voltage more than 250 volts. Hence, the stability of the traditional automatic change over switch 100 will vary with the input voltage. Thus, there may be a variation of voltage even when there is a high voltage and a small voltage supply from the mains.

The double pole relay switch 106 may not work if there is a less input voltage at the input terminal. Further, the double pole relay switch 106 may burn if there is more voltage leading to destroying the entire automatic change over switch. In fact, the traditional automatic change over switch 100 does not resist high and may not work at low voltages. The voltage is not stable and the cost is also high due use of the transformer, and the double pole switch. Accordingly, there remains a need for a compact automatic change over switch which will withstand large voltage ranges and operate even in low voltage.

SUMMARY

In view of the foregoing, an embodiment herein provides a voltage stable automatic change over switch that includes a capacitive circuit that receives an input voltage from a supply mains, a rectifier with filter unit directly connected to the capacitive circuit. The rectifier with a filter unit receives an input voltage from the capacitive circuit and converts it to a DC voltage. Voltage drop at the capacitive circuit is directly proportional to the input voltage. Two single pole relay switches directly connected to the rectifier with the filter unit. Each of the single pole relay switches include a coil. A voltage controller directly connected to the rectifier with the filter unit. The voltage controller maintains a voltage across the single pole relay switches such that the voltage does not exceed a threshold voltage. The single pole relay switches select at least one of the supply mains or an input supply from a generator and connects to a load. The single pole relay switches select the supply mains when the coils of the single pole relay switches are energised by the supply mains. The single pole relay switches select selects the generator when the coils are energised by the input supply from the generator.

The supply mains is a single phase supply that ranges from 90 volts to 300 volts. The voltage controller includes one or more diodes directly connected with each other. The diodes decrease the heat dissipation per unit area of the voltage stable automatic change over switch. The voltage stable automatic change over switch includes a relay having a coil. The relay is directly connected to the voltage controller. The capacitive circuit limits the current in the single pole relay switches and the relay. The relay is energised and the generator is turned off when the coil of the relay receives a voltage from the voltage controller. The voltage controller further includes a filtering capacitor directly connected to the diodes. The filtering capacitor reduces ripples in voltage across the relay. Number of the diodes depends upon the threshold voltage to be controlled.

In another aspect, a cascaded automatic change over switch is provided. The cascaded automatic change over switch includes a first automatic change over switch and a second automatic change over switch. The first automatic change over switch includes a first capacitive circuit that receives at least one of a phase supply from a three phase supply mains, a first rectifier with a filter unit directly connected to the first capacitive circuit. The rectifier with the filter unit receives an input voltage from the first capacitive circuit and converts to DC voltage. A first and a second single pole relay switches directly connected to the first rectifier with filter unit. The first and the second single pole relay switches include a coil. A first voltage controller directly connected to the first rectifier with the filter unit. The first voltage controller maintains a first voltage across the first and the second single pole relay switches such that the first voltage does not exceed a threshold voltage.

The second automatic change over switch includes a second capacitive circuit that receives at least one of a phase supply from the three phase supply mains. Voltage drop at the first and second capacitive circuit is directly proportional to the three phase supply mains. A second rectifier with a filter unit directly connected to the second capacitive circuit. The second rectifier with filter unit receives the input voltage converts it to a DC voltage. A third and a fourth single pole relay switches directly connected to the second rectifier with the filter unit. The third and the fourth single pole relay switches include a coil. A second voltage controller directly connected to the second rectifier with the filter unit. The second voltage controller maintains a second voltage across the third and the fourth single pole relay switches such that the second voltage does not exceed a threshold voltage. The single pole relay switches select either the three phase supply mains or an input supply from a generator and connects to a three phase load. The switches select the three phase supply mains when the coils are energised by the three phase supply mains. The switches select the generator when the coils are energised by the input supply from the generator.

The first voltage controller and the second voltage controller include a plurality of diodes directly connected with each other. The cascaded automatic change over switch may include a relay that is directly connected to any of the first voltage controller or the second voltage controller. The relay includes a coil. The relay is energised and the generator is turned off when the coil of the relay receives a voltage from the first voltage controller or the second voltage controller. The first voltage controller includes a first filtering capacitor directly connected to the diodes of the first voltage controller and the second voltage controller includes a second filtering capacitor directly connected to the diodes of the second voltage controller. The first and the second filtering capacitor reduce ripples in voltage across the relay. Number of the diodes in the first voltage controller and the second voltage controller depends upon the threshold voltage to be controlled.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4A illustrates a table view of experimental values at different input voltages in the circuit having the relay of FIG. 2 according to an embodiment herein;

FIG. 6A illustrates a table view of experimental values at different input voltages with the relay of FIG. 2 for a Digital Storage Oscilloscope (DSO) according to an embodiment herein and FIG. 6B illustrates an experimental setup with DSO according to an embodiment herein;

DETAILED DESCRIPTION OF PREFERRED EMBODIMENTS

Figure 1:
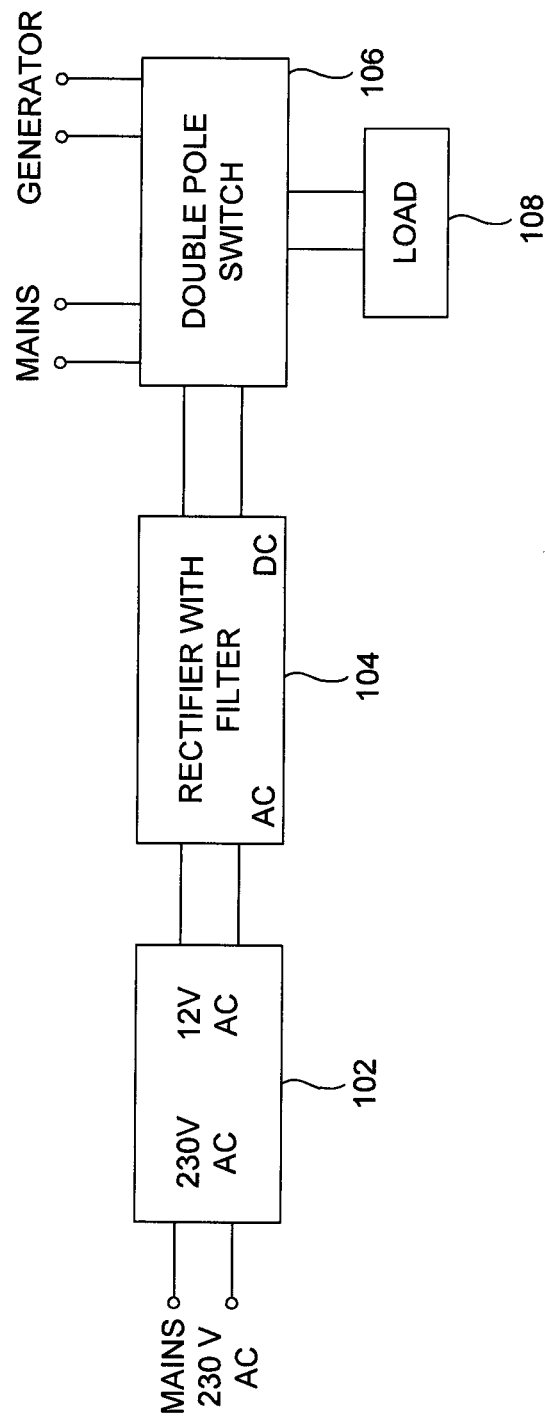
FIG. 1 illustrates a traditional automatic change over switch having a transformer unit, a rectifier with filter unit, a double pole relay switch, and a load.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Accordingly, there remains a need for a compact automatic change over switch which will withstand large voltage ranges and operate even in low voltage. The embodiments herein achieve this by providing a capacitive circuit and a voltage controller that maintains the coil voltage of the two single pole relay switch constant. In one embodiment, the voltage controller is of 25 volts. Thus, the voltage controller maintains the voltage below 25 volts across the coils of the two single pole relay switch constant. In one embodiment, the voltage controller includes 36 diodes directly connected in series with each other. Referring now to the drawing, and more particularly to FIGS. 2 to 7C, where similar reference characters denote corresponding features consistently throughout the figures, there are shown preferred embodiments.

Figure 2A:
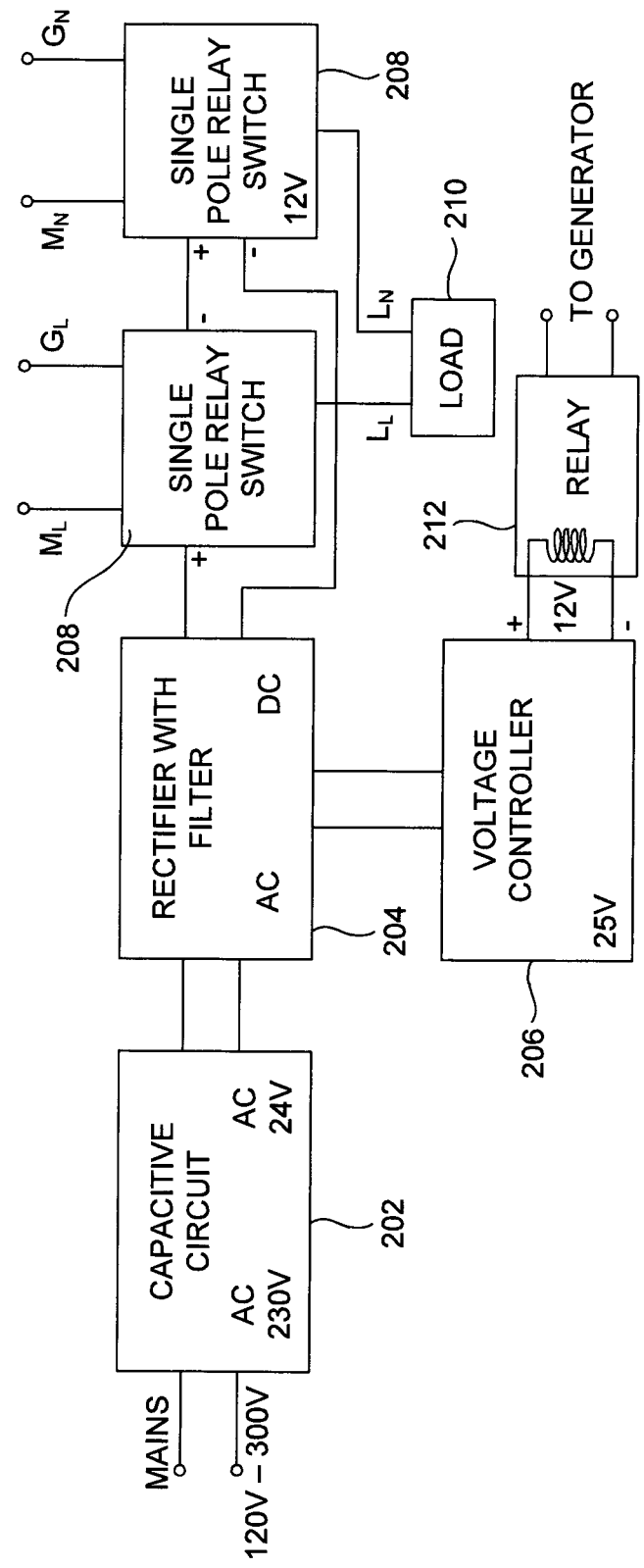
FIG. 2A illustrates a block diagram of a compact automatic change over switch having a capacitive circuit, a rectifier with filter unit, a voltage controller, two single pole relay switches, and a short relay for a single phase supply according to an embodiment herein.

FIG. 2A illustrates a block diagram of a compact automatic change over switch 200 having a capacitive circuit 202, a rectifier with filter unit 204, a voltage controller 206, two single pole relay switches 208, and a short relay 210 for a single phase supply according to an embodiment herein. In one embodiment, the compact automatic change over switch 200 withstands up to 300 volts. In another embodiment, the compact automatic change over switch 200 withstands 30 Amperes for the mains and 20 Amperes for the generator. The capacitive circuit 202 receives an input of 120 to 300 volts AC and limits the current in the input. The capacitive voltage drop is directly proportional to the input voltage. The output from the capacitive circuit 202 is fed as an input to the rectifier with the filter unit 204. The capacitive circuit 202 limits the current in the single pole relay switches 208 and the relay 212. The total input voltage is a vector sum of the voltage across the coils of the two single pole relay switches 208 and the voltage across the capacitive circuit 202. The rectifier with the filter unit 204 receives an input of 24 volts AC from the capacitive and converts to approximately 24 volts DC. In one embodiment, rectifier with the filter unit 204 includes a capacitive filter that converts the 24 volts AC to 24 volts DC and provides 12 volts to each of the coils of the two single pole relay switch 208.

The voltage controller 206 maintains the coil voltage of the two single pole relay switch 208 constant. In one embodiment, the voltage controller 206 is of 25 volts. Thus, the voltage controller 206 mains the voltage below a threshold voltage (e.g., 25 volts) across the coils of the two single pole relay switch 208 constant. In one embodiment, the voltage controller 206 includes a series of diodes (e.g., 1N4007 diode). In one embodiment, the voltage controller 206 includes 36 diodes directly connected in series with each other. The 36 diodes connected in series with each other in the voltage controller 206 increases the surface area and subsequently decrease the heat dissipation per unit area, and can provide a multiple of 0.7 volts till 25 volts. In one embodiment, the diodes may provide voltage to an additional unit (e.g., a timer to energise a solenoid of a diesel generator set) that can be further connected to the compact automatic change over switch 200. The numbers of diodes depend on the threshold voltage that needs to be controlled. The voltage controller 206 also includes a filtering capacitor (not shown in FIG.).

The DC output voltage from the rectifier with the filter unit 204 is fed to the two single pole relay switches 208. In addition, the mains supply and a supply from a generator are fed as an input to the two single pole relay switches 208. In one embodiment, the lines from the mains ML and the generator GL are supplied to one of the single pole relay switches 208 and the neutrals of the mains MN and the generator GN are supplied to the second single pole relay switches 208 as shown in FIG. 2. The coil voltages in two single pole relay switches 208 remain constant (12 volts in each single pole relay switches 208). Since, the voltage at the coils of the two single pole relay switches 208 is constant, the two single pole relay switches 208 selects any one of a supply mains or supply from the generator and connects to the load 210 through the lines LL and LN. In one embodiment, if both, the mains and the supply from the generator are available to the two single pole relay switch 208, then both two single pole relay switches 208 will select the mains as the coils are energized by mains.

The relay 212 includes a coil that is directly connected to the voltage controller 206. The coil of the relay 212 receives 12 volts supply from the voltage controller 206. When there is a supply from the mains, the voltage controller 206 has voltage (e.g., 0-25 volts) that supplies voltage to the coil of the relay 212 and energises the relay 212. The output from the relay terminals 210 is fed to the generator (e.g., spark plug generators) to stop the generator. The generator is stopped as the supply from the mains is available and the compact automatic change over switch connects the mains to the load 210.

Figure 2B:
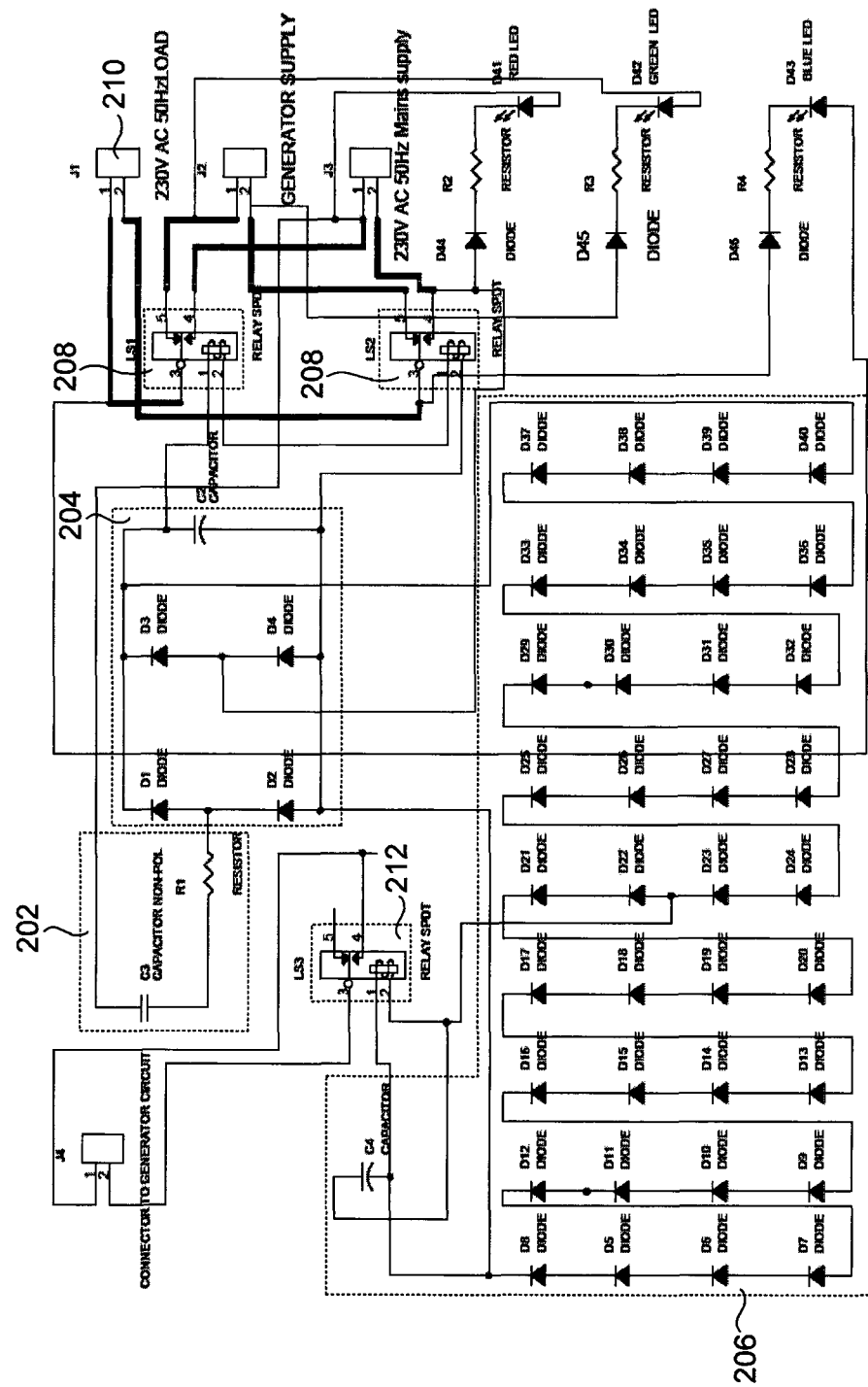
FIG. 2B illustrates a circuit diagram of the compact automatic change over switch with the relay of FIG. 2 according to an embodiment herein.
Figure 2C:
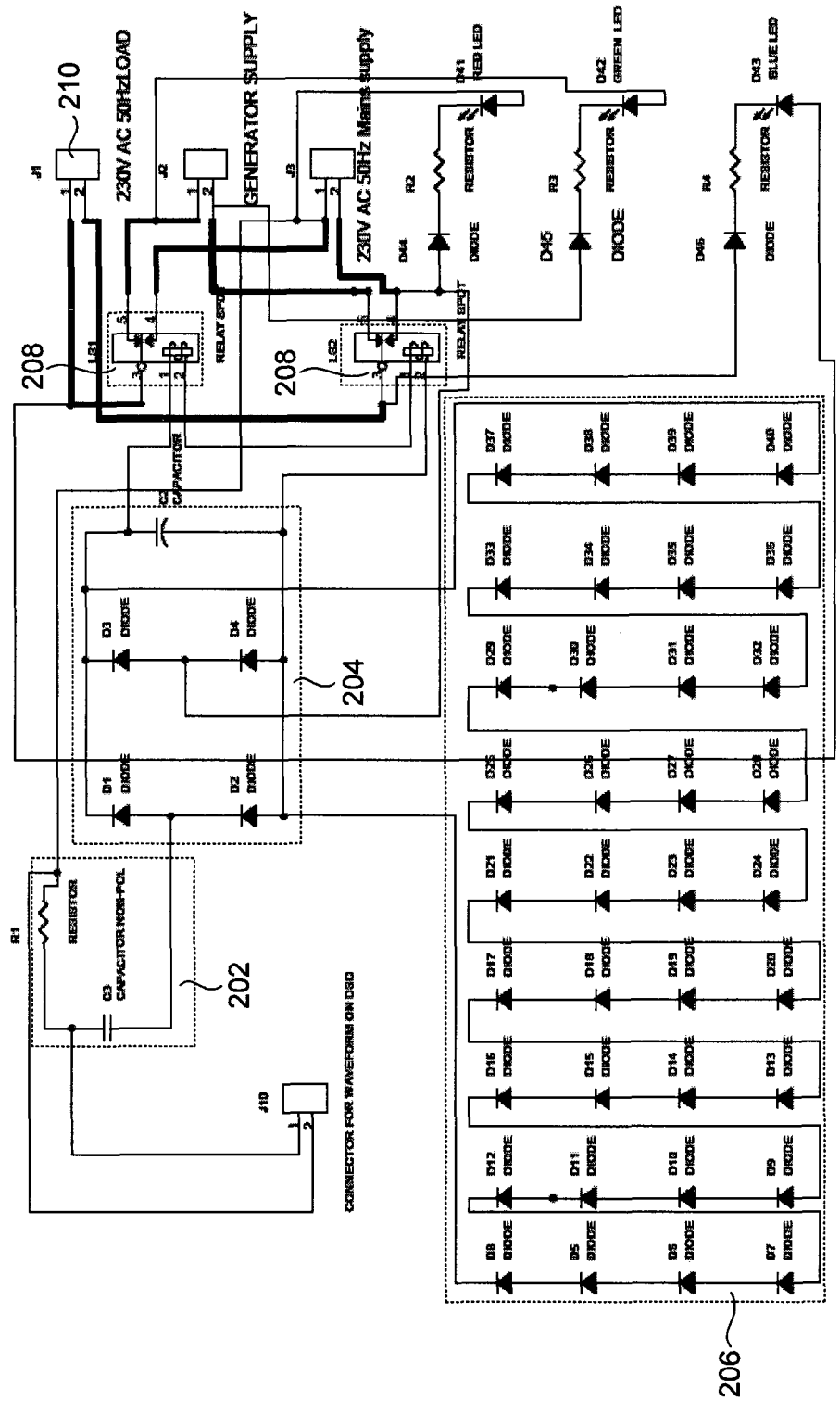
FIG. 2C illustrates a circuit diagram of the compact automatic change over switch without the relay according to an embodiment herein.
Figure 2D:
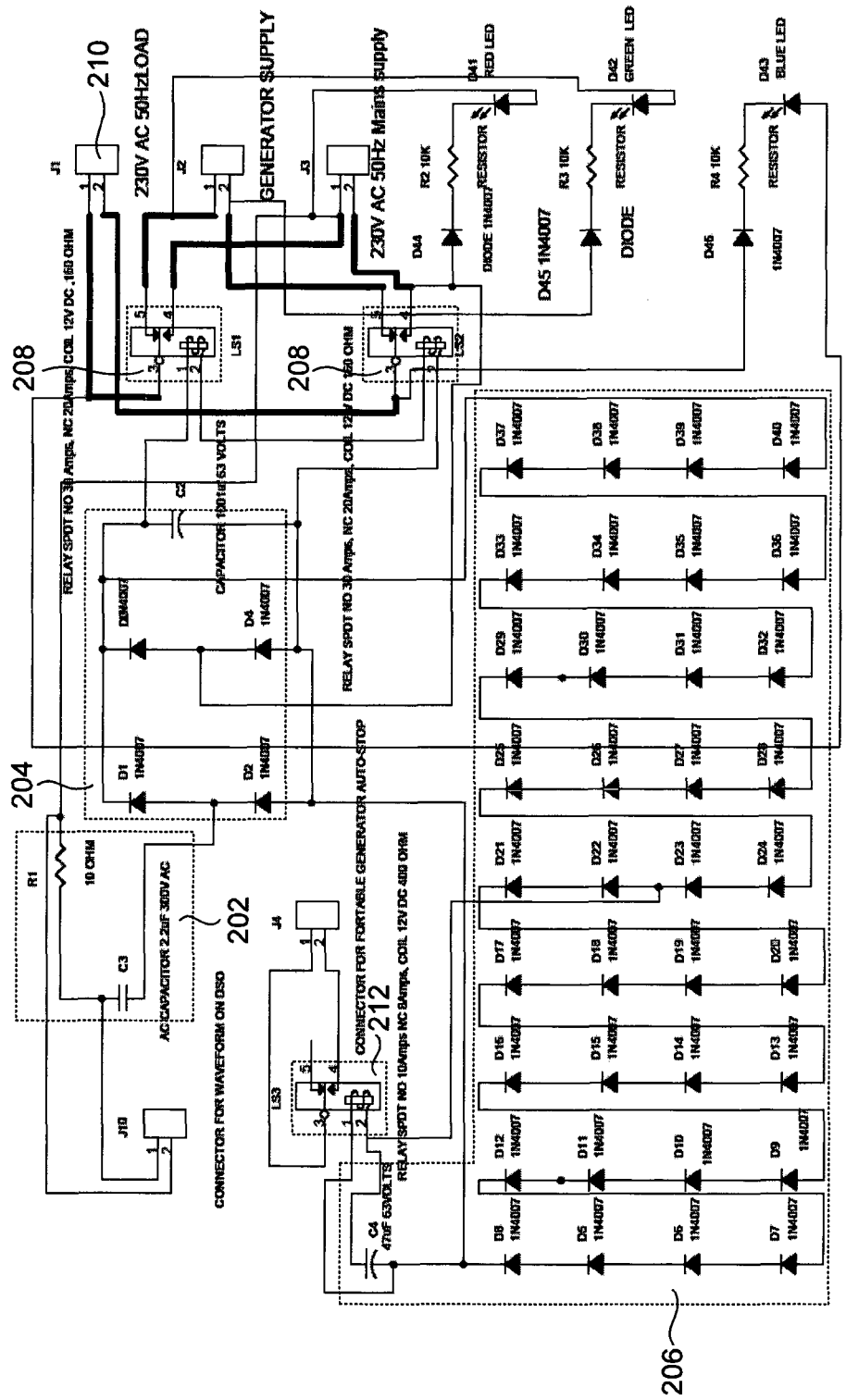
FIG. 2D illustrates a circuit diagram of the compact automatic change over switch with experimental values according to an embodiment herein.
Figure 2E:
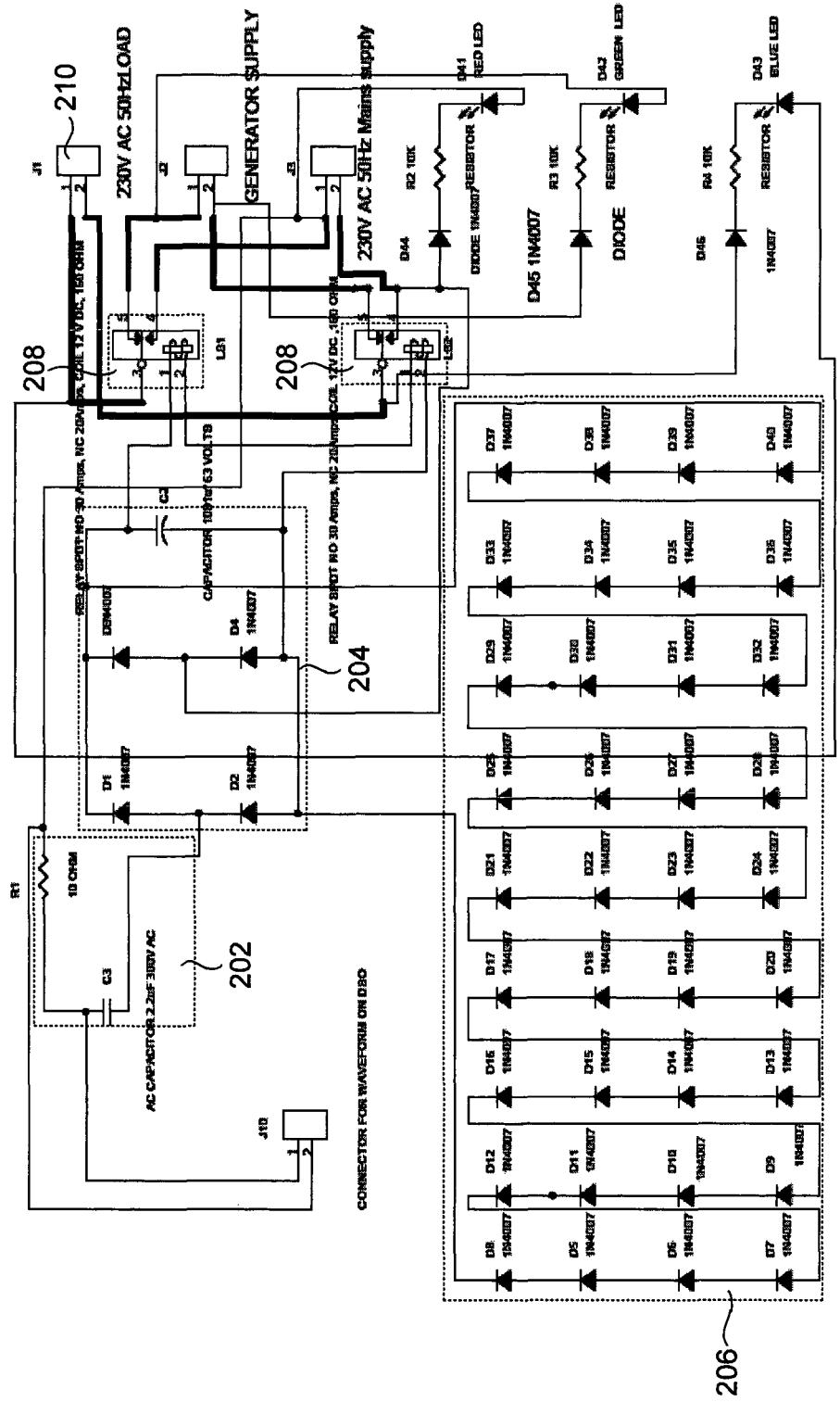
FIG. 2E illustrates a circuit diagram of the compact automatic change over switch with experimental values without having a relay according to an embodiment herein.

With reference to FIG. 2A, FIG. 2B illustrates a circuit diagram of the compact automatic change over switch 200 according to an embodiment herein. With reference to FIG. 2A, FIG. 2C illustrates a circuit diagram of the compact automatic change over switch 200 without the relay 212 according to an embodiment herein. With reference to FIG. 2A through FIG. 2C, FIG. 2D illustrates a circuit diagram of the compact automatic change over switch 200 with the experimental values according to an embodiment herein. With reference to FIG. 2A through FIG. 2C, FIG. 2E illustrates a circuit diagram of the compact automatic change over switch 200 with the experimental values without having the relay 212 according to an embodiment herein. These circuits may be cascaded for a three phase supply. J1 (also referred to as a connector) is connected to the load 210. This is the output of the circuit. J2 is the input to the circuit and is connected to the generator supply or any other power source. J3 is also input to the circuit. Through J3, the mains power supply is connected to the circuit.

LS1 and LS2 also referred to as the single pole relay switches 208 are used for changeover operation (i.e., connecting the load 210 to mains power supply or to the generator supply). When mains power supply is available, coils of the LS1 and LS2 gets energized and connects the load 210 to the mains power supply. When the mains power supply is not available it connects to generator power supply. LS3 (also referred to as the relay 212) is used for switching of the generator when mains power supply is available. When mains power supply is available the coil of the LS3 gets energized and pin 3 and 4 of LS3 relay gets shorted which is connected to generator auxiliary circuit resulting in switching off the generator.

The relay used in the circuit has the rated NO (normally open) current of 30 Amps at 230 volts AC and rated NC current of 20 Amps at 230 volts AC. Therefore, the circuit can transfer maximum power of 230V*30 Amps=6900 VA from mains to the load 210 and can transfer a maximum power of 230V*20 Amps=4600 VA from the generator supply to the load 210. The mains power supply is taken through resistor R1 in series with the capacitor C3. Capacitor C3 is used for providing impedance and limiting the current through the driving circuit. Since in capacitor power loss is almost zero, it is used in the circuit for limiting the current through the relay coil.

The D1, D2, D3, and D4 are used as bridge rectifier in the circuit. These diodes make the current flow in unidirectional hence providing DC current to the relays LS1, LS2, and LS3. Capacitors C2 and C4 are used for filtering. Diode D5-D40 is used for controlling the voltage across capacitor C2 and the voltage across the C4 (relay LS3's coil). Therefore, the 36 diodes connected in series allow large surface area for cooling. This allows tapping different voltages for "automatic change over with high voltage cutoff". The filtering capacitor C4 reduces ripples in voltage across the relay 212.

With reference to FIG. 2A through FIG. 2E, FIG. 3 illustrates a cascaded automatic change over switch for a three phase supply according to an embodiment herein. In one embodiment, a relay may be connected. In another embodiment, the relay may not be connected. In one embodiment, the cascaded compact automatic change over switch includes a first compact automatic change over switch and a second compact automatic change over switch. The first and second compact change over switch includes a capacitive circuit 302A-B, a rectifier with filter unit 304A-B, a voltage controller 306A-B, four single pole relay switches 308A-D, and a three phase load.

The capacitive circuit 302A-B receives an input of from a 3 phase supply mains and limits the current in the input. The capacitive voltage drop is directly proportional to the input voltage. The capacitive circuit 302A-B limits the current in the single pole relay switches 308A-D and the relay (not shown in FIG.). The output from the capacitive circuit 302A-B is fed as an input to the rectifier with filter unit 304A-B. The rectifier with filter unit 304A-B receives an input of 24 volts AC from the capacitive and converts to approximately 24 volts DC. In one embodiment, the rectifier with filter unit 304A-B includes a capacitive filter that converts the 24 volts AC to 24 volts DC and provides 12 volts to each of the coils of the four single pole relay switch 308A-D.

The voltage controller 306A-B maintains a constant coil voltage of the four single pole relay switch 308A-D. In one embodiment, the voltage controller 306A-B is of 25 volts. Thus, the voltage controller 306A-B mains the constant voltage below 25 volts across the coils of the four single pole relay switch 308A-B, 308C-D. In one embodiment, each of the voltage controller 306A-B includes a series of diodes (e.g., IN4007 diode). In one embodiment, the voltage controller 306A-B includes 36 diodes directly connected in series with each other. The 36 diodes connected in series with each other in the voltage controller 306A-B increases the surface area and subsequently decrease the heat dissipation per unit area, and can provide a multiple of 0.7 volts till 25 volts. In one embodiment, the diodes may provide voltage to an additional unit (e.g., a timer to energise a solenoid of a diesel generator set) that can be further connected to the compact automatic change over switch.

The DC output voltage from the rectifier with filter unit 304A-B is fed to the four single pole relay switches 308A-B, 308C-D. In addition, the mains supply and a supply from a generator are fed as an input to the four single pole relay switches 308A-B, 308C-D. One single pole relay switch 308A of the first compact automatic change over switch receives a Red live line from the mains (LMR) and from the generator (LGR). The second single pole relay switch 308B of the first compact automatic change over switches receives a Neutral line from the mains (NM) and from the generator (NG). Similarly, the first single pole relay switch 308C of the second compact automatic change over switches receives a Yellow live line from the mains (LMY) and from the generator (LGY). The second pole relay switch 308D of the second compact automatic change over switches receives a Blue live line from the mains (LMB) and from the generator (LGB).

Figure 3:
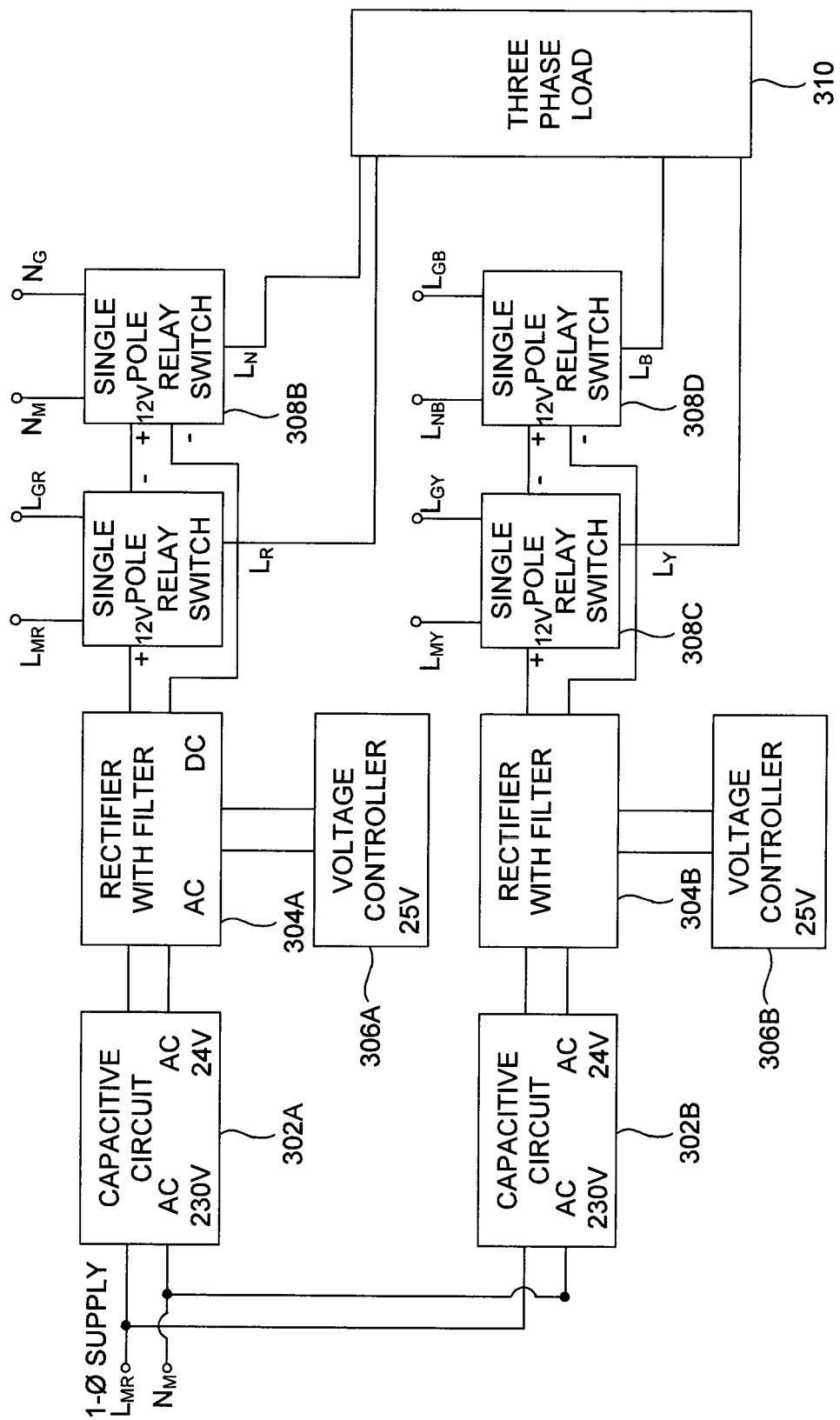
FIG. 3 illustrates a cascaded automatic change over switch for a three phase supply according to an embodiment herein.

The outputs from the single pole relay switches 308A-D are connected to a 3-phase load 310 as shown in FIG. 3.

The coil voltages in four single pole relay switches 308A-D remain constant (12 volts in each single pole relay switches 308A-D). Since, the voltage at the coils of the single pole relay switches 308A-D is constant, the single pole relay switches 308A-D select any one of a supply mains or supply from the generator and connects to the load 310 through the RYB lines and the neutral. In one embodiment, if both, the mains and the supply from the generator are available to the single pole relay switch 308A-D, and then the single pole relay switches 308A-D will select the supply mains as the coils are energized by the supply mains.

FIG. 4A illustrates a table view of experimental values at different input voltages in the circuit having the relay 212 according to an embodiment herein. The input is given through mains power supply J3 in the circuit with the relay 212. The table includes input voltage field 402, voltage across capacitor (C2) field 404, voltage across capacitor (C4) field 406, voltage across capacitor (C3) field 408, and voltage across the resistor (R1) field 410. The fields 404, 406, 408, and 410 indicate the voltages across the capacitors C2, C4, and C3, and the resistor R1 at various input voltages (e.g., 10 volts, 20 volts, etc.). From the table, it is noted that the single pole relay switches 208 pick up at 90 volts when the voltage across capacitor C2 is 14.3 volts. Also, the voltage across C2 is almost constant after it reaches to 26 volts and corresponding input voltage to 240. After 240 to 285 volts input, it is observed that the voltage across C2 is almost constant. Voltage across C3 is 273 corresponding to 285 volts mains input. The voltage across C3 is in permissible limit, due to maximum limit that is 300 Volts AC. Voltage across the coil of the relay 212 does not exceed more than 13.4 volts. Hence the circuit works from an input voltage of 90 to 300 volts AC. The compact automatic change over switch 200 can operate for higher voltages (e.g., above 300 volts AC) by changing the values of the capacitors, resistors, and the diodes, in the circuit shown in FIG.

Figure 4B:
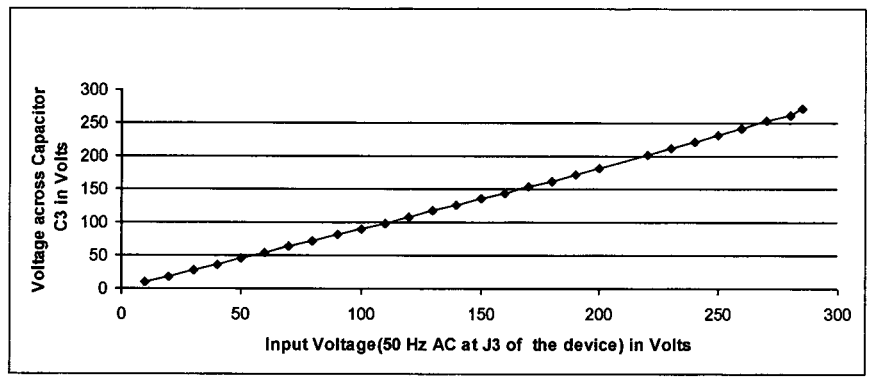
FIG. 4B is a graphical representation of the input voltage of J3 versus the voltage across the capacitor C3 according to an embodiment herein.
Figure 4C:
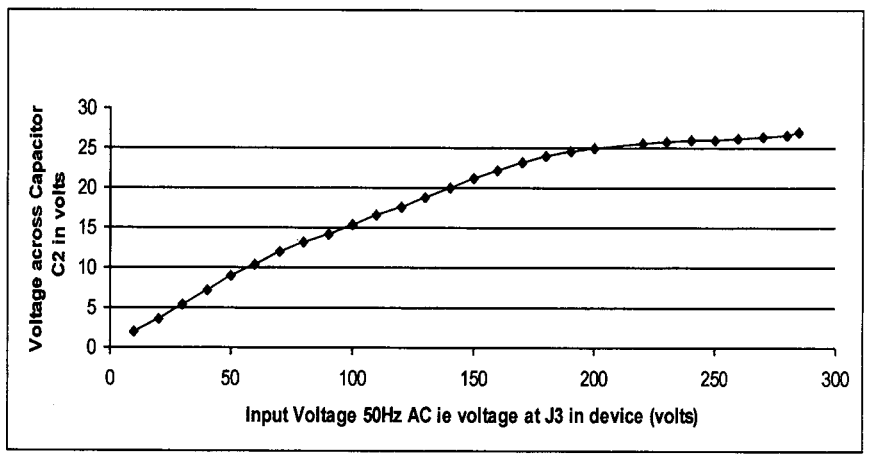
FIG. 4C is a graphical representation of the input voltage versus the voltage across the capacitor C2 according to an embodiment herein.
Figure 4D:
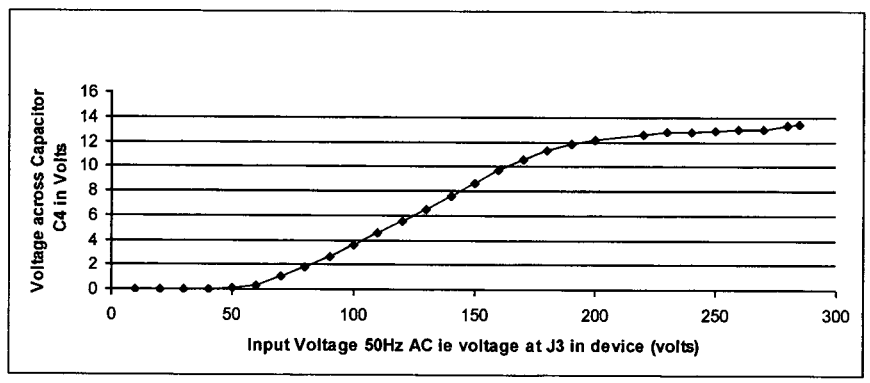
FIG. 4D is a graphical representation of the input voltage versus the voltage across the capacitor C4 according to an embodiment herein.

With reference to FIG. 4A, FIG. 4B is a graphical representation of the input voltage of J3 versus the voltage across the capacitor C3 according to an embodiment herein. With reference to FIG. 4A, FIG. 4C is a graphical representation of the input voltage versus the voltage across the capacitor C2 according to an embodiment herein. With reference to FIG. 4A, FIG. 4D is a graphical representation of the input voltage versus the voltage across the capacitor C4 according to an embodiment herein.

Figure 5A:
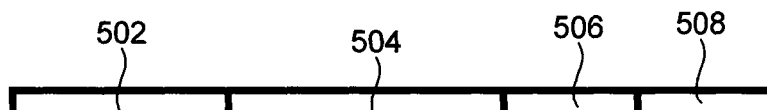
FIG. 5A illustrates a table view of experimental values at different input voltages without the relay according to an embodiment herein.

FIG. 5A illustrates a table view of experimental values at different input voltages without the relay 212 according to an embodiment herein. The table includes input voltage field 502, voltage across capacitor (C2) field 504, voltage across capacitor (C4) field 506, and voltage across the resistor (R1) field 510. The fields 504, 506, 508, and 510 indicate the voltages across the capacitors C2, C4, and the resistor R1 at various input voltages (e.g., 40 volts, 60 volts, etc.). The input is given through mains power supply in the circuit without the relay 212. From the table, it is observed that the single pole relay switches 208 picks up at an input voltage of 86 volts AC when the voltage across capacitor C2 is 15.5 volts. The voltage across C2 is almost constant after it reaches to 26 volts and corresponding input voltage to 190. After 190 to 285 volts, it is observed that the voltage across C2 is almost constant. Voltage across C3 is 277 volts corresponding to 285 volts input. The voltage across C3 is in permissible limit due to maximum limit that is 300 volts AC for the used value of the capacitor C2. Hence the circuit works from an input voltage of 86 to 300 volts AC.

Figure 5B:
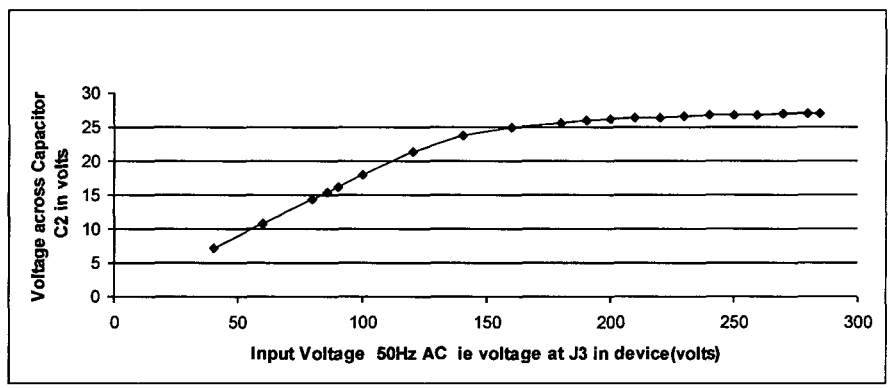
FIG. 5B is a graphical representation of the input voltage of J3 versus the voltage across the capacitor C3 according to an embodiment herein.
Figure 5C:
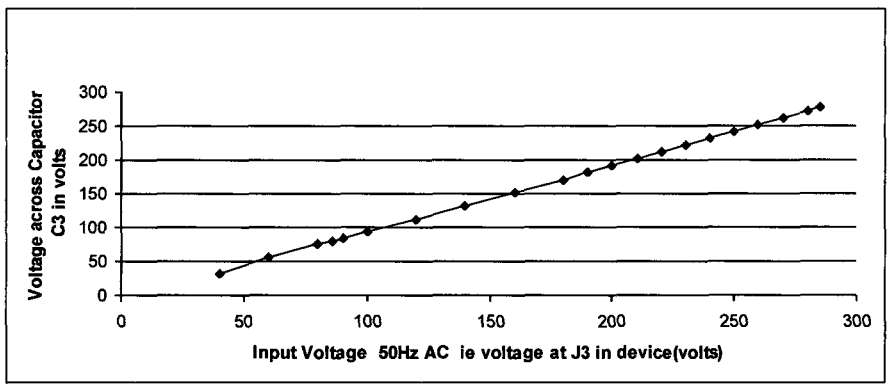
FIG. 5C is a graphical representation of the input voltage versus the voltage across the capacitor C2 according to an embodiment herein.

With reference to FIG. 5A, FIG. 5B is a graphical representation of the input voltage of J3 versus the voltage across the capacitor C3 according to an embodiment herein. With reference to FIG. 5A, FIG. 5C is a graphical representation of the input voltage versus the voltage across the capacitor C2 according to an embodiment herein.

Figure 6B:
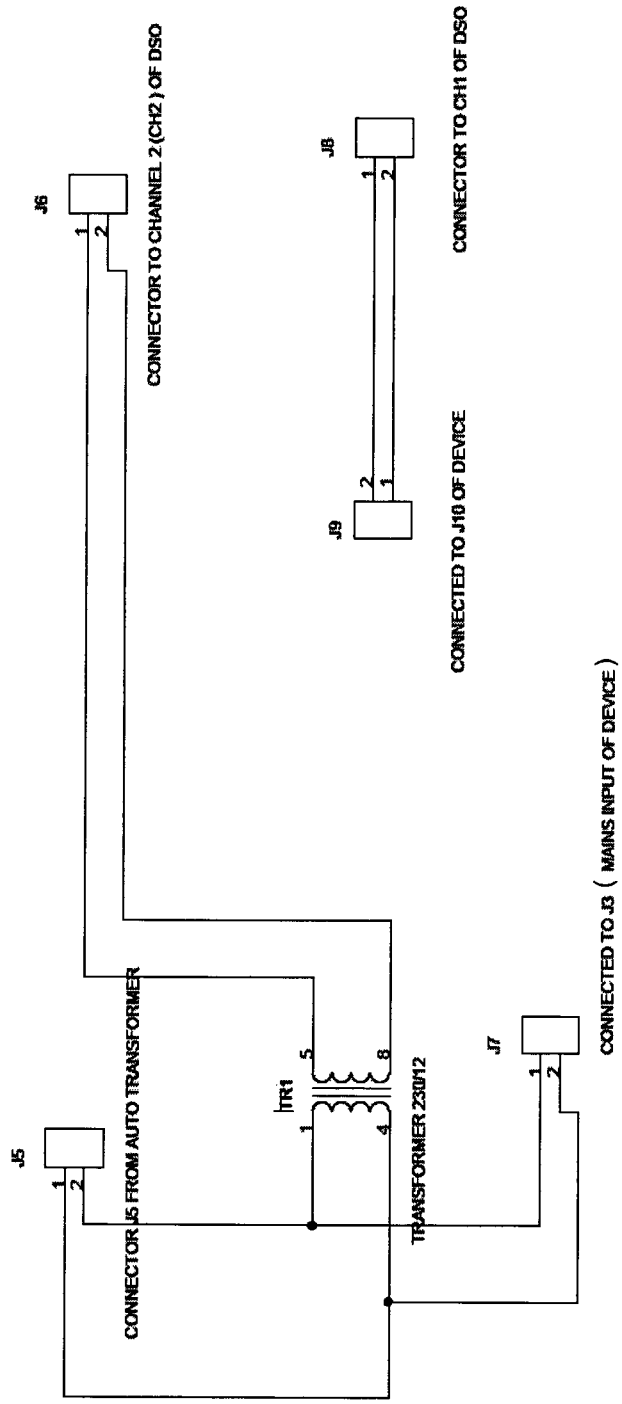
Figure 6C:
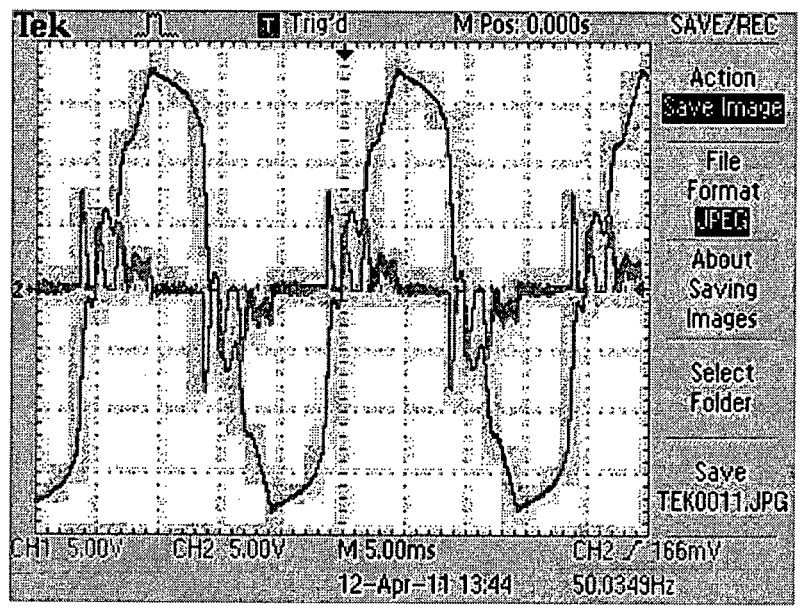
FIG. 6C illustrates a graphical representation of the transient waveform with respect to corresponding input voltage 221 volts ac 50 Hz according to an embodiment herein.
Figure 6D:
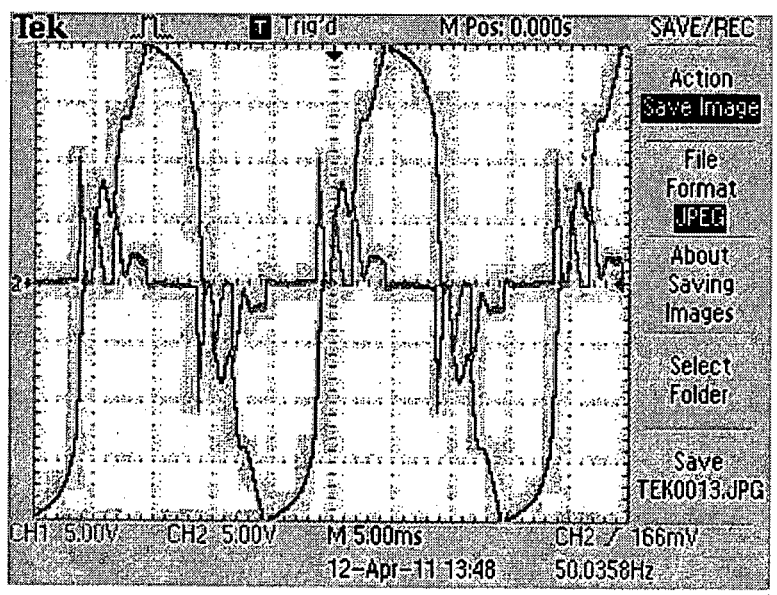
FIG. 6D illustrates a graphical representation of the transient waveform with respect to corresponding input voltage 252 volts ac 50 Hz according to an embodiment herein.

FIG. 6A illustrates a table view of experimental values at different input voltages with the relay 212 of FIG. 2 for a Digital Storage Oscilloscope (DSO) according to an embodiment herein. The table includes input voltage field 602, voltage in secondary transformer used in experiment field 604, voltage across C3 field 606, voltage across C2 field 608, voltage across R1 field 610, and voltage across C4 field 612. With reference to FIG. 6A, FIG. 6B illustrates an experimental setup with DSO according to an embodiment herein. For experimental purpose, Channel 1 (ch1) of the DSO was connected to J8. J8 was connected to J9. J9 was connected to J10 of circuit. J10 connected across R1 of the circuit. Channel 2 (ch2) of the DSO was connected to the J6. J6 is connected to secondary of TR1. J5 and J7 are connected to the primary of the transformer Tr1. J5 is connected to the auto-transformer. J7 is connected to J3 (J3 mains input to the circuit). With reference to FIG. 6A, FIG. 6C illustrates a graphical representation of the transient waveform with respect to corresponding input voltage 221 volts ac 50 Hz according to an embodiment herein. FIG. 6D illustrates a graphical representation of the transient waveform with respect to corresponding input voltage 252 volts ac 50 Hz according to an embodiment herein.

Figure 7A:
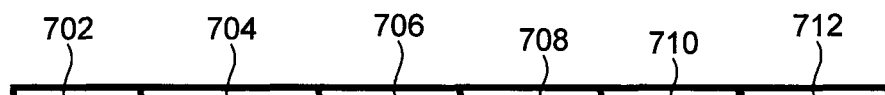
FIG. 7A illustrates a table view of experimental values at different input voltages without the relay for a Digital Storage Oscilloscope (DSO) according to an embodiment herein.
Figure 7B:
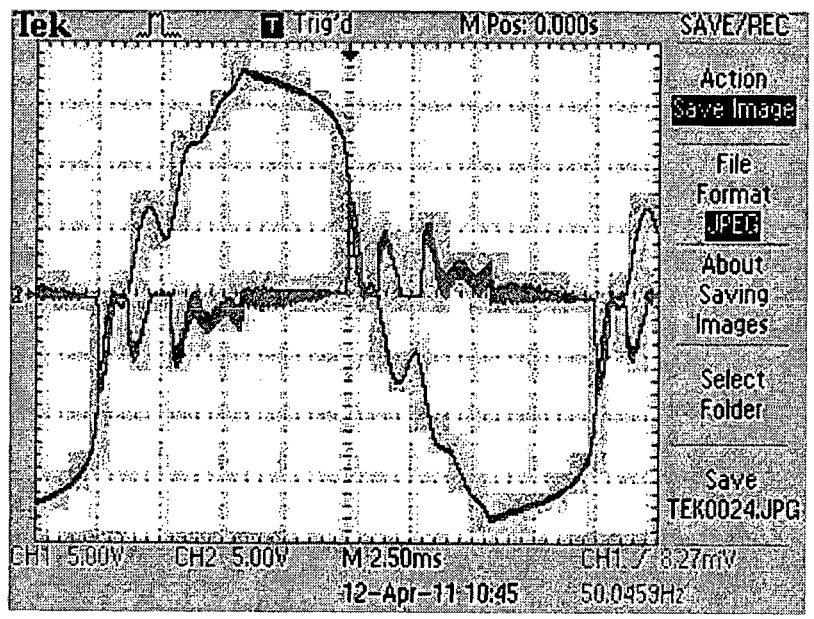
FIG. 7B illustrates a graphical representation of the transient waveform with respect to corresponding input voltage according to a first example embodiment herein.
Figure 7C:
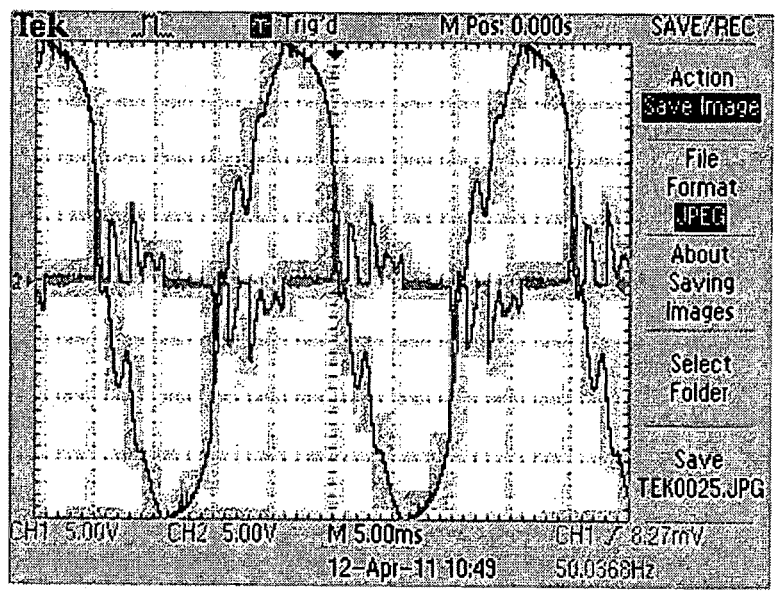
FIG. 7C illustrates a graphical representation of the transient waveform with respect to corresponding input voltage according to a second example embodiment herein.

FIG. 7A illustrates a fable view of experimental values at different input voltages without the relay 212 for a Digital Storage Oscilloscope (DSO) according to an embodiment herein. The table includes input voltage field 702, voltage in secondary transformer used in experiment field 604, transformer voltage ratio field 606, voltage across C2 field 608, voltage across R1 field 610, and voltage across C3 field 612. For experimental purpose, Channel 1 (ch1) of DSO was connected to J8. J8 was connected to J9. J9 was connected to J10 of circuit. J10 connected across R1 of the circuit. Channel 2 (ch2) of the DSO was connected to the J6. J6 is connected to secondary of TR1. J5 and J7 are connected to the primary of the transformer Tr1. J5 is connected to the auto-transformer. J7 is connected to J3 (J3 mains input to the circuit). With reference to FIG. 7A, FIG. 7B illustrates a graphical representation of the transient waveform with respect to corresponding input voltage 230 volts ac 50 Hz according to an embodiment herein. FIG. 7C illustrates a graphical representation of the transient waveform with respect to corresponding input voltage 251 volts ac 50 Hz according to an embodiment herein.

The compact automatic change over switch 200 includes the capacitive circuit 202 and the voltage controller 206 that maintains the coil voltage of the two single pole relay switch 208 constant. In one embodiment, the voltage controller 206 is of 25 volts. Thus, the voltage controller 206 maintains the voltage below 25 volts across the coils of the two single pole relay switch 208 constant. The voltage controller 206 includes 36 diodes connected in series that increases the surface area and subsequently decreases the heat dissipation per unit area.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can be practiced with modification within the spirit and scope of the appended claims.

What is claimed is:

1. A voltage stable automatic change over switch comprising:
   a capacitive circuit that receives an input voltage from a supply mains, wherein voltage drop at said capacitive circuit is directly proportional to said input voltage;
   a rectifier with a filter unit directly connected to said capacitive circuit, wherein said rectifier with filter unit receives an input voltage from said capacitive circuit and converts it to a DC voltage;
   at least two single pole relay switches directly connected to said rectifier with said filter unit, wherein each of said single pole relay switches comprises a coil; and
   a voltage controller directly connected to said rectifier with said filter unit, wherein said voltage controller maintains a voltage across said single pole relay switches such that said voltage does not exceed a threshold voltage, wherein said single pole relay switches select at least one of said supply mains or an input supply from a generator and connects to a load, wherein said single pole relay switches select said supply mains when said coils of said single pole relay switches are energised by said supply mains, wherein said single pole relay switches select said input supply from said generator when said coils of said single pole relay switches are energised by said input supply from said generator and said voltage controller comprises a plurality of diodes directly connected with each other, wherein said plurality of diodes decrease a heat dissipation per unit area of said voltage stable automatic change over switch.

2. The voltage stable automatic change over switch of claim 1, wherein said supply mains is a single phase supply ranging from 90 volts to 300 volts.

3. The voltage stable automatic change over switch of claim 1, wherein number of said diodes depends upon said threshold voltage to be controlled.

4. The voltage stable automatic change over switch of claim 1, further comprising a relay having a coil, wherein said relay is directly connected to said voltage controller.

5. The voltage stable automatic change over switch of claim 4, wherein said capacitive circuit limits the current in said single pole relay switches and said relay.

6. The voltage stable automatic change over switch of claim 4, wherein said relay is energised and said generator is turned off when said coil of said relay receives a voltage from said voltage controller.

7. The voltage stable automatic change over switch of claim 4, wherein said voltage controller further comprises a filtering capacitor directly connected to said diodes, wherein said filtering capacitor reduces ripples in voltage across said relay.

8. A cascaded automatic change over switch comprising:
   a first automatic change over switch comprising:
      a first capacitive circuit that receives at least one of a phase supply from a three phase supply mains;
      a first rectifier with a filter unit directly connected to said first capacitive circuit, wherein said rectifier with filter unit receives an input voltage from said first capacitive circuit and converts it to a DC voltage;
      a first and a second single pole relay switches directly connected to said first rectifier with said filter unit, wherein said first and said second single pole relay switches comprising a coil; and a first voltage controller directly connected to said first rectifier with said filter unit, wherein said first voltage controller maintains a first voltage across said first and said second single pole relay switches such that said first voltage does not exceed a threshold voltage; and a second automatic change over switch comprising:

a second capacitive circuit that receives at least one of a phase supply from said three phase supply mains, wherein voltage drop at said first and second capacitive circuit is directly proportional to said three phase supply mains;

a second rectifier with a filter unit directly connected to said second capacitive circuit, wherein said second rectifier with filter unit receives said input voltage converts it to a DC voltage;

a third and a fourth single pole relay switches directly connected to said second rectifier with said filter unit, wherein said third and said fourth single pole relay switches comprises a coil; and a second voltage controller directly connected to said second rectifier with said filter unit, wherein said second voltage controller maintains a second voltage across said third and said fourth single pole relay switches such that said second voltage does not exceed a threshold voltage, wherein said first and said second, and said third and said fourth single pole relay switches select either said three phase supply mains or an input supply from a generator and connects to a three phase load, wherein said single pole relay switches select said three phase supply mains when said coils of said single pole relay switches are energized by said three phase supply mains, wherein said single pole relay switches select said input supply from said generator when said coils of said single pole relay switches are energised by said input supply from said generator.

9. The cascaded automatic change over switch of claim 8, wherein said first voltage controller and said second voltage controller comprises a plurality of diodes directly connected with each other.

10. The cascaded automatic change over switch of claim 8, further comprising a relay, wherein said relay is directly connected to at least one of said first voltage controller or said second voltage controller, wherein said relay comprises a coil.

11. The cascaded automatic change over switch of claim 10, wherein said relay is energised and said generator is turned off when said coil of said relay receives a voltage from said first voltage controller or said second voltage controller.

12. The cascaded automatic change over switch of claim 10, wherein said first voltage controller comprises a first filtering capacitor directly connected to said diodes of said first voltage controller and said second voltage controller comprises a second filtering capacitor directly connected to said diodes of said second voltage controller, wherein said first and said second filtering capacitor reduce ripples in voltage across said relay.

13. The cascaded automatic change over switch of claim 12, wherein number of said diodes in said first voltage controller and said second voltage controller depends upon said threshold voltage to be controlled.

* * * * *